J. A. RUSH.
FISH GUARD.
APPLICATION FILED JUNE 27, 1917.
1,265,251.
Patented May 7, 1918.
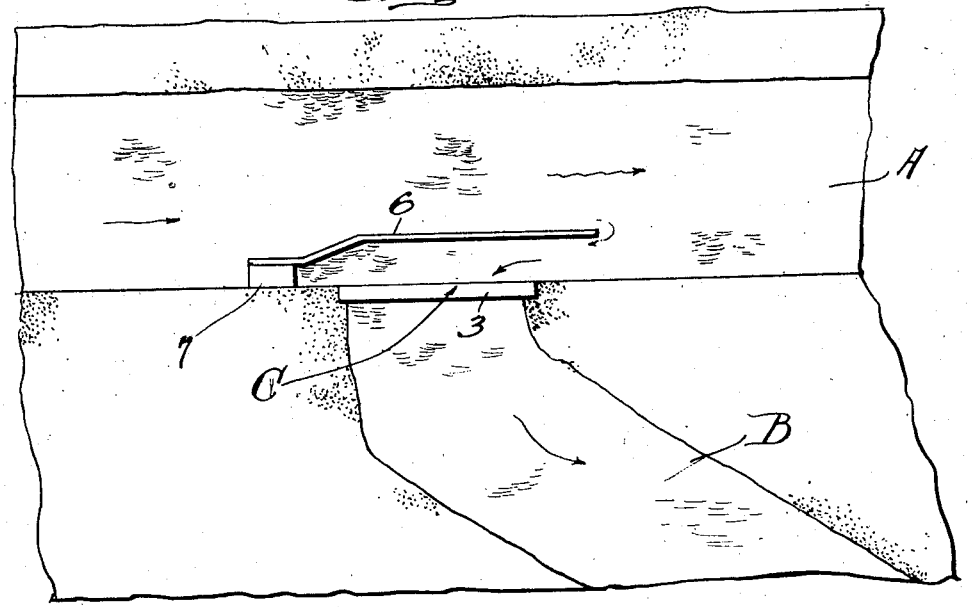
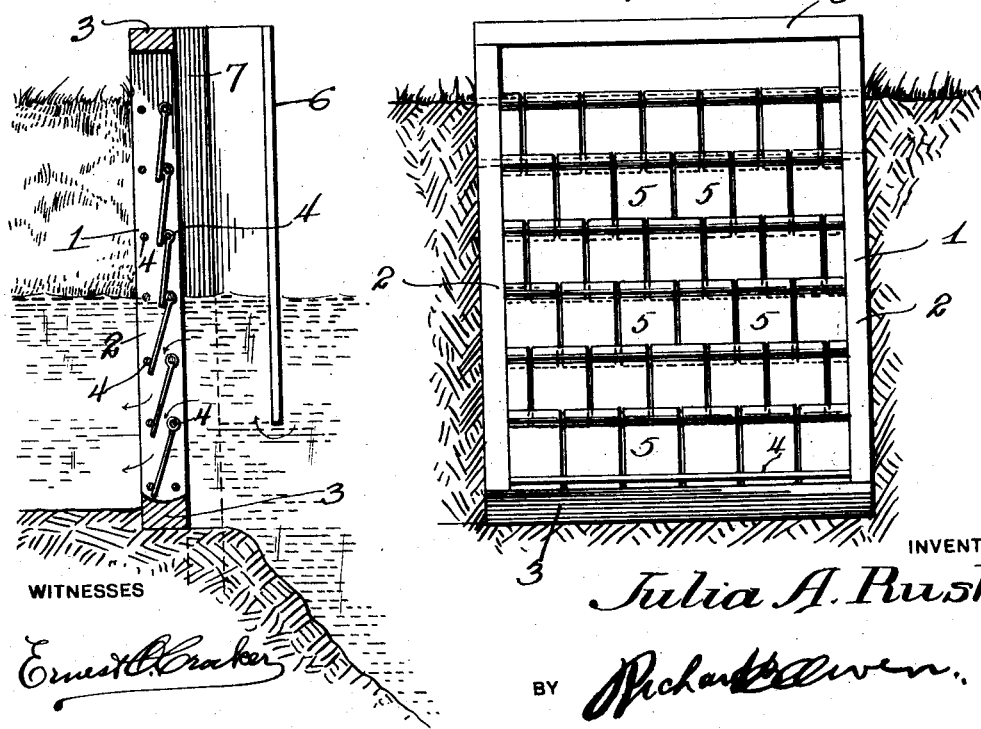
INVENTOR
Julia A. Rush
BY Richard B. Owen
ATTORNEY
WITNESSES

UNITED STATES PATENT OFFICE.

JULIA A. RUSH, OF WAYNESBURG, PENNSYLVANIA, ASSIGNOR OF ONE-HALF TO WINFIELD S. RUSH, OF WAYNESBURG, PENNSYLVANIA.

FISH-GUARD.

1,265,251.  Specification of Letters Patent.  Patented May 7, 1918.

Application filed June 27, 1917. Serial No. 177,323.

*To all whom it may concern:*

Be it known that JULIA A. RUSH, a citizen of the United States, residing at Waynesburg, in the county of Greene and State of Pennsylvania, has invented certain new and useful Improvements in Fish-Guards, of which the following is a specification.

This invention relates to fish guards and the primary object of the invention is to provide an improved structure for use in preventing fish from entering irrigating ditches.

One of the principal objects of the invention is to provide a device of this character at the entrance of the irrigating ditch which will permit water to freely flow into the ditch from the main or supply stream but which will operate to exclude fish and refuse.

A further object of this invention is the provision of a fish guard which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a plan view showing the invention in applied position.

Fig. 2 is a vertical transverse section.

Fig. 3 is a side elevation.

Referring to the drawing, wherein is illustrated the preferred form of my invention, and in which like numerals of reference indicate corresponding parts throughout the several views, the main or supply stream A feeds water to the irrigating ditch B through the entrance C and it will be understood, as is well known in irrigating systems of this character, that any number of these irrigating ditches may lead from the main stream A. Erected in the entrance is a rectangular frame or supporting structure 1 which consists of the upright bars 2 held in spaced relation by the upper and lower frame bars 3. This frame is preferably constructed so that the upper frame bar 3 will be above the top of the irrigating ditch B and the frame is set exactly at the entrance as clearly shown by Fig. 1 of the drawing.

A plurality of rods 4 are mounted in the frame, the rods having their ends fixed in the upright bars 2 so that they extend transversely across the frame. The rods 4 are arranged in pairs as shown to advantage in Fig. 2 of the drawing and the pairs are arranged in superposed relation being vertically spaced apart for predetermined distances. This arrangement of the rods provides a forward row and a rearward row. Mounted upon each rod in the forward row is a plurality of plates 5 which are mounted to swing upon the rods and which act as gates. The length of each plate 5 is such as to permit the lower edge to overlap the top of the adjacent lower plate so that the rods in the rear row will act as stop members for the plates to prevent them from swinging too far rearwardly as the water enters the irrigating ditch. Fig. 2 shows the water entering the irrigating ditch from the main stream and it will be noted that the water level has caused certain of the plates beneath the water level to swing inwardly for a slight distance so that the water is permitted to pass into the ditch as indicated by the arrows. This distance between the plates, however, is small enough to exclude all fish and other objectionable animal life which frequents small streams.

To prevent the floating debris from entering the irrigating ditch I have provided a shield 6 which consists of a relatively large plate disposed edgewise in the main stream and in spaced relation to the frame 1. The lower edge of this shield is preferably disposed in a plane above the bottom of the irrigating ditch so that the water may be permitted to pass freely under the shield to enter the ditch. An upright support 7 has one edge of the shield fixed thereto to support the shield in position.

This shield coöperates with the swinging gates to cause clear water to pass into the irrigating ditch. It will be noted that the slight space provided for the intake of the water between the plates might cause leaves, twigs, sticks, and similar debris to clog the spaces if some shielding means were not provided. Shield 6, therefore, causes such debris to pass by the entrance to the ditch while the plates prevent the entrance of the fish which might attempt to enter beneath the shield or around the edge thereof.

From the foregoing it will be observed that a very simple and durable fish guard has been provided, the details of which embody the preferred form. I desire it to be understood however, that slight changes in the minor details of construction may be made without departing from the spirit of the invention or the scope of the claims hereunto appended.

I claim:

1. In a fish guard for irrigating ditches, the combination of a frame mounted at the entrance of the ditch, and a plurality of rods carried by the frame and arranged in pairs in superposed relation, one rod of each pair being provided with a plurality of swinging plates extending downwardly between the adjacent pair of rods.

2. In a fish guard for irrigating ditches, the combination of a frame mounted at the entrance of the ditch, and a plurality of rods carried by the frame and arranged in pairs in superposed relation, one rod of each pair being provided with a plurality of swinging plates extending downwardly between the adjacent pair of rods, the said rods in each pair being laterally spaced apart to permit slight swinging movement of the said plates.

3. In a fish guard for irrigating ditches, the combination of a frame mounted at the entrance of the ditch, and a plurality of rods carried by the frame and arranged in pairs in superposed relation, one rod of each pair being provided with a plurality of swinging plates extending downwardly between the adjacent pair of rods, the said rods in each pair being laterally spaced apart to permit slight swinging movement of the said plates, the said plates all being mounted on the foremost rods in each pair and having their lower edges overlapping the top edges of the adjacent plates.

In testimony whereof I affix my signature in presence of two witnesses.

MRS. JULIA A. RUSH.

Witnesses:
R. H. ELY,
FLOYD HICKMAN.

Copies of this patent may be obtained for five cents each, by addressing the "Commissioner of Patents, Washington, D. C."